US009697686B2

(12) United States Patent
Tafty

(10) Patent No.: US 9,697,686 B2
(45) Date of Patent: Jul. 4, 2017

(54) COMPUTER-IMPLEMENTED SYSTEM, METHOD AND DEVICE FOR DISPLAYING THE TOTAL COUNT AND VALUE OF CASINO CHIPS

(71) Applicant: Nader Tafty, Fountain Valley, CA (US)

(72) Inventor: Nader Tafty, Fountain Valley, CA (US)

( * ) Notice: Subject to any disclaimer, the term of this patent is extended or adjusted under 35 U.S.C. 154(b) by 0 days.

(21) Appl. No.: 14/740,064

(22) Filed: Jun. 15, 2015

(65) Prior Publication Data

US 2015/0279160 A1 Oct. 1, 2015

Related U.S. Application Data

(60) Provisional application No. 62/012,996, filed on Jun. 17, 2014.

(51) Int. Cl.
*G06F 17/00* (2006.01)
*G07F 17/32* (2006.01)

(52) U.S. Cl.
CPC ...... *G07F 17/3248* (2013.01); *G07F 17/3225* (2013.01)

(58) Field of Classification Search
USPC ........................................................ 463/16-25
See application file for complete search history.

(56) References Cited

U.S. PATENT DOCUMENTS

| | | | | |
|---|---|---|---|---|
| 8,998,088 B2 * | 4/2015 | Koyama | H01Q 1/2216 | 235/375 |
| 2006/0258442 A1 * | 11/2006 | Ryan | G07F 17/32 | 463/29 |
| 2009/0075723 A1 * | 3/2009 | Richard | G06M 11/00 | 463/25 |
| 2011/0130185 A1 * | 6/2011 | Walker | G07F 17/3202 | 463/13 |
| 2012/0100901 A1 * | 4/2012 | Kirsch | A63F 1/18 | 463/11 |

* cited by examiner

*Primary Examiner* — Ronald Laneau
(74) *Attorney, Agent, or Firm* — Barry Choobin; Patent 360

(57) ABSTRACT

Disclosed is a computer-implemented method for displaying the total count and value of casino chips stored by a casino dealer during dealing. The method comprises receiving transmissions representative of the reception of casino chips within a groove of a dealer tray, keeping count of the number of chips within the groove at any given time by keeping count of the number of transmissions received, aggregating the values of the individual chips within the groove at any given time and displaying the count and the aggregated value of the chips on a display panel located on the dealer tray.

22 Claims, 3 Drawing Sheets

COMPUTER-IMPLEMENTED SYSTEM, METHOD AND DEVICE FOR DISPLAYING THE TOTAL COUNT AND VALUE OF CASINO CHIPS

BACKGROUND

Field of the Invention

The present invention relates to equipment employed for monitoring various activities at a gaming table inside a casino, and more particularly to a computer-implemented system, method, and device for displaying the total count and value of casino chips at any given time.

A dealer tray is counted regularly for various reasons, such as: a) to close a gaming table, b) to determine winnings or losses at the table, c) to determine winnings or losses for a particular player, d) to determine a dealer's performance, e) to fill a tray that is short in chips, f) to withdraw from a tray that has too much chips, or g) to determine the accuracy of a dealer's payout. Traditionally, all activities related to the counting of dealer trays are conducted manually. The counting of chips on a dealer tray is conducted by a dealer, a member of the floor staff, security personnel, while the entire counting activity is closely monitored by at least one surveillance operator. Due to the high monetary value of the chips, the importance of their handling security and the sensitivity of count accuracy, this activity of counting is always redundant and therefore, time consuming. Moreover, the recording is also a manual activity, where the information regarding the count and the amount is recorded on paper form, verified by several casino staff and finally recorded on the casino computer network.

Problems associated with the manual count of dealer trays include: a) large amount of employee time is taken by the activity, b) requiring of three to four casino employees at one time to be engaged, c) occurrences of inaccuracies in various stages like the count, recording or data entry, e) loss of valuable surveillance time and personnel dedicated to monitoring the activity, f) stopping a game for a considerable time temporarily when a dealer tray must be replenished on a live table, g) retroactively managing of the amount of chips in dealer trays, and h) retroactively analyzing both the dealer's and player's performances.

Additionally, casinos must constantly create new and maintain operational processes to ensure accuracy and speed up the dead time allocated to maintenance of dealer trays. Moreover, considerable time must be allotted for the training of all new dealers, floor staff, security officers and surveillance personnel for correct performance of these procedures.

Therefore, in the light of what is discussed, there is a need in the art for a computer-based solution that takes the accounting of the chips off the hands of the casino personnel and as a result, simplifies the operational procedures of the casino and as well as, save on the precious man-hours.

SUMMARY

The present invention, in an embodiment, comprises a dealer tray that the casino dealers use to store and transact casino chips from it at a gaming table wherein, notably, the dealer tray itself counts, aggregates, displays the total count and value of the chips that are received thereon. Notably, each chip is embedded with a Radio Frequency Identification (RFID) tag that emits an electronic signature, which is indicative of the monetary value of the chip. The dealer tray comprises a plurality of elongate grooves for receiving the chips therewithin, such that, the coins abut one another about one of the two faces thereof, while the circumferences thereof abut the groove. Each groove is lined with an RFID strip, which is sensitive to the reception of the coins with the corresponding groove. The dealer tray further comprises a plurality of display panels disposed thereon wherein, each display panel corresponds to one or more grooves, preferably a pair of juxtaposed grooves.

The tray further comprises a processing unit disposed therewithin that determines the total count and value of the chips in each groove so as to eventually display the same on the corresponding display panels. The processing unit comprises a count aggregation module and a value aggregation module.

Once a coin is received within the groove, the coin comes into contact with the corresponding RFID strip as a result of which, a transmission from the RFID strip is emanated indicating the reception of the coin. The count module, by adding up the number of received transmissions, determines the total count of the chips. The value module, in the similar manner, by adding up the respective values of the received coins arrives at the aggregated value of the chips within the groove. Once both the final output information is determined, as the processing module is in operative communication with the display panels, the same is displayed on the corresponding display panel.

Other objects and advantages of the embodiments herein will become readily apparent from the following detailed description taken in conjunction with the accompanying drawings.

FIGURES

Reference Numerals

10—Computer-implemented System
12—Dealer Tray
14—Chip
16—Groove
18—RFID Strip
20—Lip Panel
22—Display Panel
23—Communications Network
24—Processing Unit
26—Count Aggregation Module
28—Value Aggregation Module
30—Count Display
32—Value Display

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Embodiments of the present invention are directed to a computer-implemented system, method, and device for displaying, in real-time, the total count and the aggregated value of casino chips stored by a casino dealer during dealing. Each chip is embedded with a Radio Frequency Identification (RFID) tag that emits an electronic signature, which is indicative of the monetary value of the chip.

Figure 1:
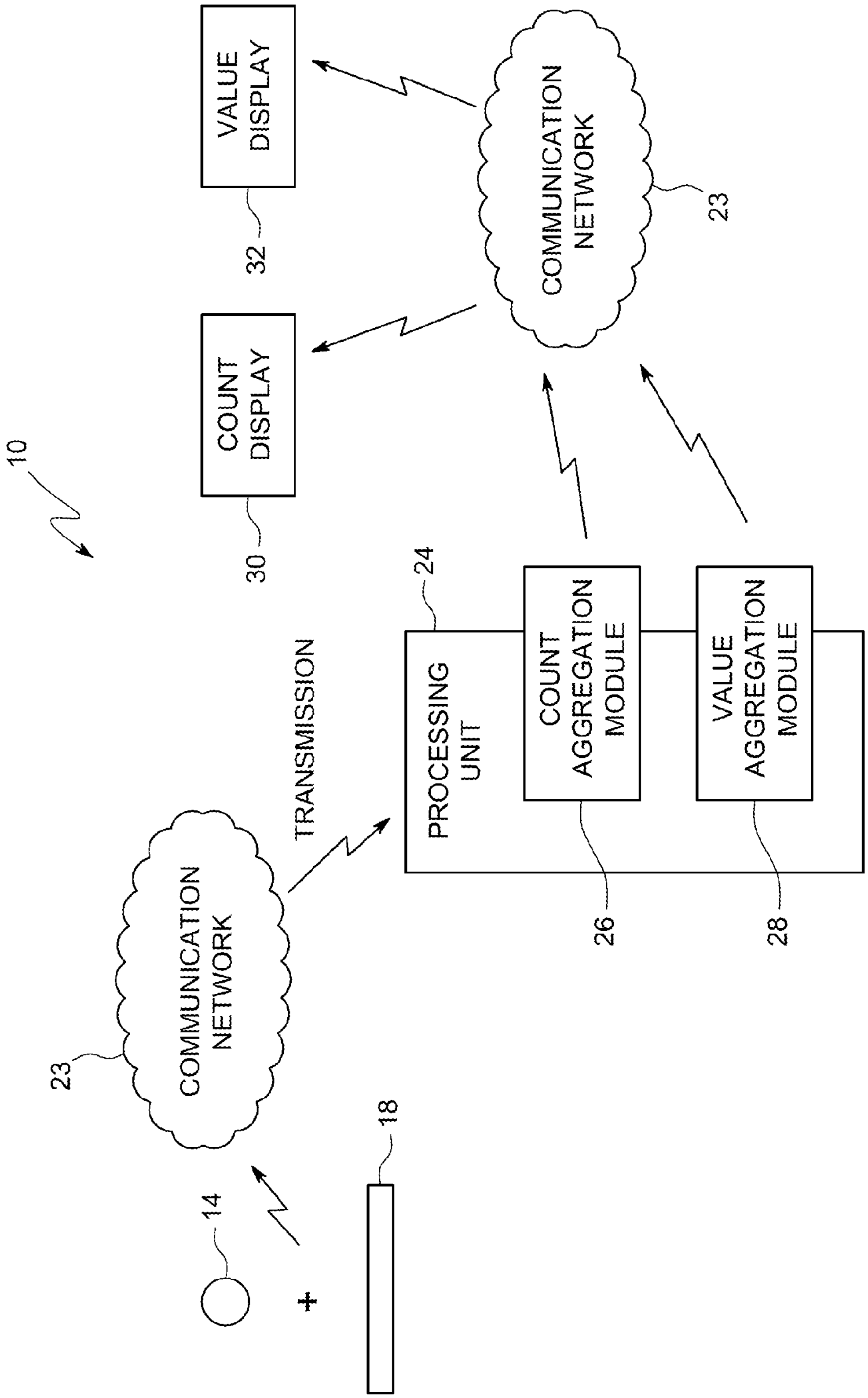
FIG. 1, according to a preferred embodiment of the present invention, is an illustration of a block diagram of the system.
Figure 2:
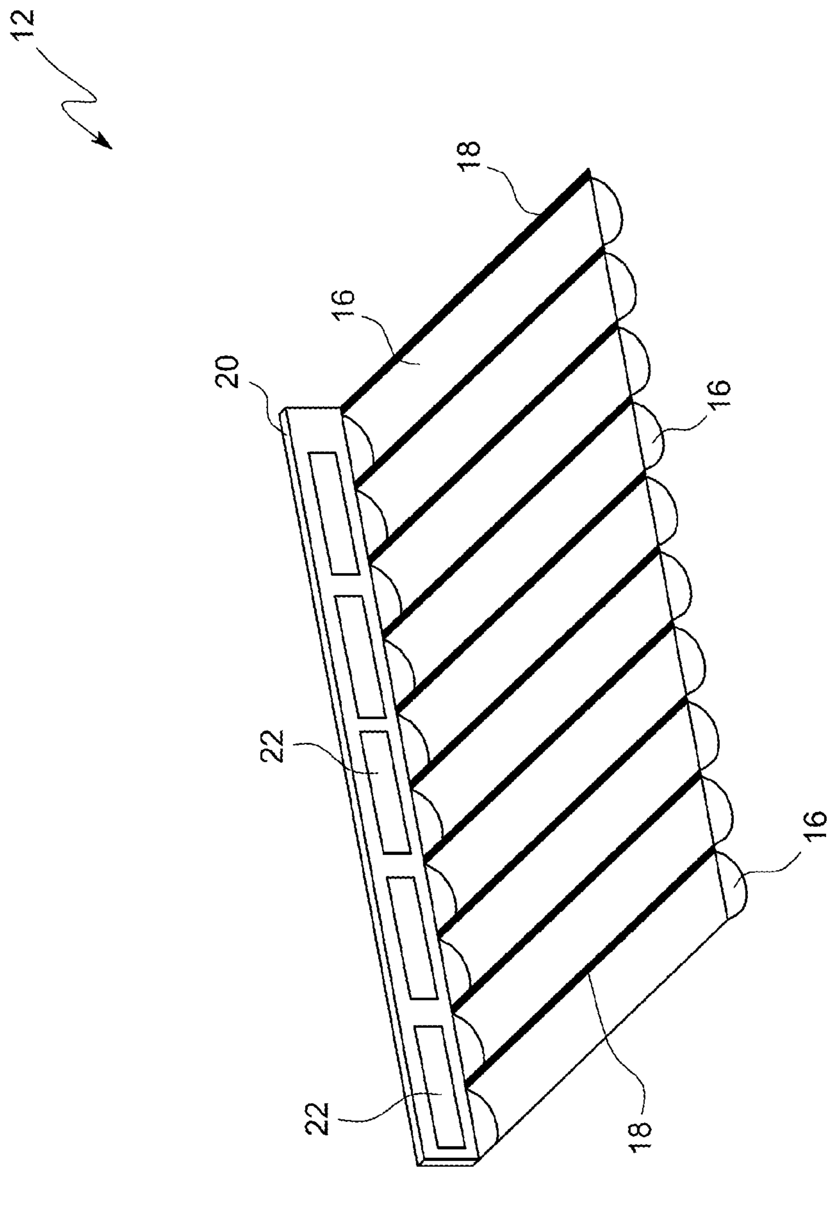
FIG. 2, according to an embodiment of the present invention, is a top perspective view of the dealer tray.

Referring to FIGS. 1 and 2, the system 10 of the present invention comprises a dealer tray 12 for receiving the chips 14 that the casino dealers use to store and transact chips from it wherein, notably, it is the dealer tray 12 itself that displays the total count and value of the chips 14 that are placed thereon. The dealer tray 12 comprises a plurality of elongate grooves 16, which are disposed parallel to one another. As can be appreciated from FIG. 2, each groove 16 is of uniform substantially semi-circular in cross-section. Coins 14 are received within the groove 16 such that, the coins 14 abut one another about one of the two faces thereof, while the circumferences thereof abut the groove 16. As the groove 16 is of semi-circular cross-section, as the coins 14 are received within the groove 16 in the aforementioned fashion, the inner contour of the groove 16 matches with that of the circumferential contour of the coins 14. Each groove 16 is lined with an RFID strip 18, which is sensitive to the reception of the coins 14 with the corresponding groove 16. The dealer tray 12 further comprises a lip panel 20, which is perpendicular to the rest of the tray 12. The lip panel 20, in turn, comprises a plurality of display panels 22 disposed thereon wherein, each display panel 22 corresponds to a pair of juxtaposed grooves 16. In other words, the display panel 22 displays the total count and value of the chips 14 in the corresponding grooves 16 individually. In another embodiment, the display panel 22 is configured to display the total count and value of the chips 14 in the corresponding grooves 16 collectively.

Still referring to FIGS. 1 and 2, the system 10 further comprises a processing unit 24 that determines the total count and value of the chips 14 in each groove 16 so as to eventually display the same on the respective display panels 22. The processing unit 24 is disposed in operative communication between the RFID strips 18 and the corresponding display panels 22. The processing unit 24 comprises a count aggregation module 26 and a value aggregation module 28 wherein, the utility of each of which will become apparent from the following body of text. In an embodiment, the processing unit 24 is a part of the tray 12.

Still yet referring to FIGS. 1 and 2, once a coin 14 is received within the groove 16, the coin 14 comes into contact with the corresponding RFID strip 18 as a result of which, a transmission from the RFID strip 18 is emanated indicating the reception of the coin 14. As can be appreciated from FIG. 1, the transmission is received by the processing module 24 via a communications network 23, such as, the Internet, Local Area Network (LAN), Bluetooth, etc. The count module 26, by adding up the number of received transmissions, determines the total count of the chips 14. The value module 28, in the similar manner, by adding up the respective values of the received coins 14 arrives at the aggregated value of the chips 14 within the groove 16. Once both the final outputs are determined, as the processing module 24 is in operative communication with the display panels 22, the same are communicated to the corresponding display panel 22 over the communications network 23 so as to be eventually displayed thereon.

Figure 3:
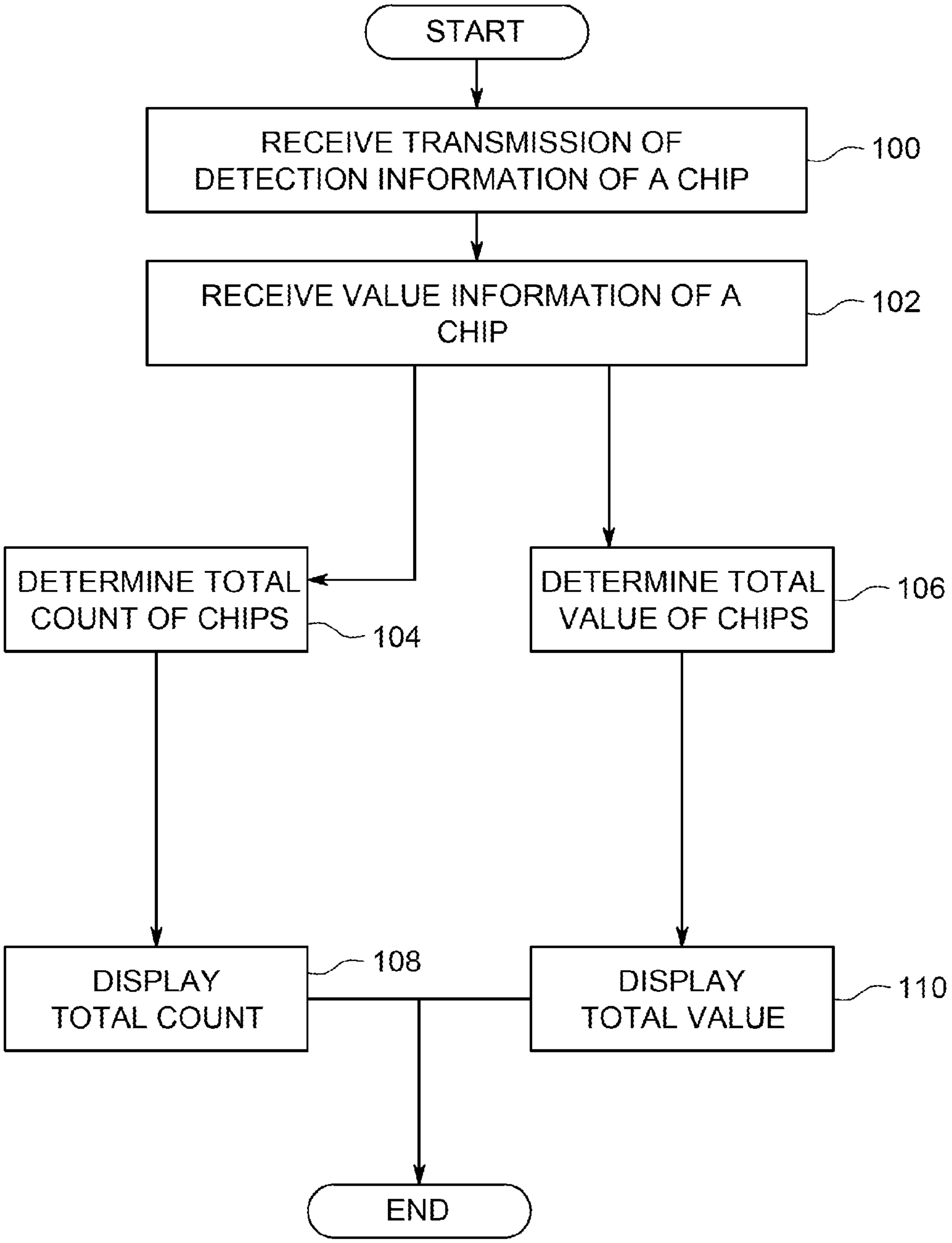
FIG. 3, according to an alternate embodiment of the present invention, is a flowchart of the method.

Referring to FIGS. 1 through 3, the method of present invention initiates with a processing unit 24 receiving a transmission (step 100), which is indicative of a chip 14 being received within one of a plurality of elongate grooves 16 of a dealer tray 12 that the casino dealers use to store and transact chips 14 from it at a gaming table. More particularly, the groove 16 is lined with an RFID strip 18, which, by means of touch-sensitivity, is sensitive to the reception of the chip 14 within the groove 16. Notably, the transmission is further indicative of the value of the chip 14 (step 102). Once the transmission is received, the total count of the transmissions, which is equivalent to the total number of coins 14 so far received, is determined (step 104) by a count module 26, which is a part of the processing unit 24. In a manner similar to step 102, the aggregate of the values of the coins 14 so far received is determined (step 106) by a value module 28, which is a part of the processing unit 24. The determined total count (step 104) and the aggregate values (step 106) of coins 14 received within the groove 16 are, in real-time, displayed (step 108 and 110) on a display panel 22 associated with the groove 16. In an embodiment, the processing unit 24 is a part of the tray 12.

Referring to FIG. 2, the device of the present invention comprises a preferably rectangular dealer tray 12 that the casino dealers use to store and transact chips 14 from it at a gaming table wherein, notably, it is the dealer tray 12 itself that counts, aggregates, and displays the total count and value of the chips 14 that are placed thereon. The dealer tray 12 comprises a plurality of elongate grooves 16, which are disposed parallel to one another. As can be appreciated from FIG. 2, each groove 16 is of uniform substantially semi-circular in cross-section. Coins 14 are received within the groove 16 such that, the coins 14 abut one another about one of the two faces thereof, while the circumferences thereof abut the groove 16. As the groove 16 is of semi-circular cross-section, as the coins 14 are received within the groove 16 in the aforementioned fashion, the inner contour of the groove 16 matches with that of the circumferential contour of the coins 14. Each groove 16 is lined with an RFID strip 18, which is sensitive to the reception of the coins 14 with the corresponding groove 16. The dealer tray 12 further comprises a lip panel 20, which is perpendicular to the rest of the tray 12. The lip panel 20, in turn, comprises a plurality of display panels 22 disposed thereon wherein, each display panel 22 corresponds to a pair of juxtaposed grooves 16. In other words, the display panel 22 displays the total count and value of the chips 14 in the corresponding grooves 16 individually. In another embodiment, the display panel 22 is configured to display the total count and value of the chips 14 in the corresponding grooves 16 collectively.

Still referring to FIG. 2, the device 10 further comprises a processing unit (not shown) disposed within the tray that determines the total count and value of the chips 14 in each groove 16 so as to eventually display the same on the respective display panels 22. The processing unit is disposed in operative communication between the RFID strips 18 and the corresponding display panels 22. The processing unit comprises a count aggregation module and a value aggregation module wherein, the utility of each of which will become apparent from the following body of text.

Still yet referring to FIG. 2, once a coin 14 is received within the groove 16, the coin 14 comes into contact with the corresponding RFID strip 18 as a result of which, a transmission from the RFID strip 18 is emanated indicating the reception of the coin 14. The count module, by adding up the number of received transmissions, determines the total count of the chips 14. The value module 28, in the similar manner, by adding up the respective values of the received coins 14 arrives at the aggregated value of the chips 14 within the groove 16. Once both the final outputs are determined, as the processing module is in operative communication with the display panels 22, the same are displayed on the corresponding display panel 22.

The aforementioned embodiments are able to be implemented, for example, using a machine-readable medium or article which is able to store an instruction or a set of instructions that, if executed by a machine, cause the machine to perform a method and/or operations described herein. Such machine is able to include, for example, any suitable processing platform, computing platform, computing device, processing device, electronic device, electronic system, computing system, processing system, computer, processor, or the like, and is able to be implemented using any suitable combination of hardware and/or software. The machine-readable medium or article is able to include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions is able to include any suitable type of code, for example, source code, compiled code, interpreted code, executable code, static code, dynamic code, or the like, and is able to be implemented using any suitable high-level, low-level, object-oriented, visual, compiled and/or interpreted programming language, e.g., C, C++, Java, BASIC, Pascal, Fortran, Cobol, assembly language, machine code, or the like. Functions, operations, components and/or features described herein with reference to one or more embodiments, is able to be combined with, or is able to be utilized in combination with, one or more other functions, operations, components and/or features described herein with reference to one or more other embodiments, or vice versa.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A computer-implemented system aggregating and displaying a count and a value of casino chips, each chip comprising a radio frequency identification (RFID) tag that emits an electronic signature indicative of the value of the corresponding chip, the system comprising:

(a) a dealer tray comprising:
  (i) at least one groove, each of which for receiving the chips therewithin, each of the at least one groove lined with an RFID strip sensitive to the electronic signatures emanating from the chips, the RFID strip for
    detecting the reception of a chip within the corresponding groove, and
    transmitting the detection information along with the value of the chip; and
  (ii) a display associated with each of the at least one groove; and
(b) a processing unit disposed in operative communication between an RFID strip and the corresponding display, the processing unit configured to receive transmissions from the RFID strip, the processing unit comprising:
  (i) a count aggregation module for keeping count of number of chips received within a groove by keeping count of the number of transmissions, the count displayed on the corresponding display in real-time; and
  (ii) a value aggregation module for aggregating the value of the chips received within the corresponding groove; the aggregated value displayed on the corresponding display in real-time.

2. The system of claim 1 wherein, the at least one groove comprises a plurality of grooves.

3. The system of claim 2 wherein, two grooves share a common display; the display for displaying the count and the aggregated values of the chips within the corresponding grooves.

4. The system of claim 1 wherein, each of the at least one groove is elongated.

5. The system of claim 1 wherein, each of the at least one groove is of uniform substantially semi-circular cross-section.

6. The system of claim 1 wherein, the chips are received within a groove such that, the chips abut one another about one of the two faces thereof while abutting the groove about the circumferences thereof.

7. The system of claim 6 wherein, cross-sectionally, the contour of each of the at least one groove matches with the circumference of the chip.

8. The system of claim 1 wherein, the processing unit is disposed within the tray.

9. A computer-implemented method for aggregating and displaying a value and a count of casino chips, each chip comprising a radio frequency identification (RFID) tag emitting an electronic signature indicative of the value of the corresponding chip, the method comprising:

(a) receiving transmissions representative of the reception of casino chips within a groove of a dealer tray;
(b) by keeping count of the number of transmissions received, keeping count of the number of chips within the groove at any given time;
(c) aggregating the values of the individual chips within the groove at any given time; and
(d) displaying, in real-time, the count and the aggregated value of the chips on a display located on the dealer tray.

10. The method of claim 9 wherein, the groove is elongated.

11. The method of claim 9 wherein, the dealer tray comprises a plurality of grooves disposed parallel to one another.

12. The method of claim 11 wherein, two grooves share a common display panel; the display panel for displaying the count and the aggregated values of the chips within the corresponding grooves.

13. The method of claim 9 wherein, the groove is lined with an RFID strip sensitive to the electronic signatures, the RFID strip for detecting the reception of a chip within the corresponding groove and transmitting the detection information.

14. The method of claim 9 wherein, the groove is of uniform substantially semi-circular cross-section.

15. The method of claim 9 wherein, the chips are received within a groove such that, the chips abut one another about one of the two faces thereof while abutting the groove about the circumferences thereof.

16. The method of claim 15 wherein, cross-sectionally, the contour of the groove matches with the circumference of the chip.

17. A dealer tray for receiving casino chips, automatically aggregating and displaying a value of the casino chips along with a count thereof, each chip comprising a radio frequency identification (RFID) tag embedded thereinto, the RFID tag emitting an electronic signature indicative of the value of the corresponding chip, the tray comprising:

(a) at least one groove, each of which for receiving the chips therewithin, each of the at least one groove lined with an RFID strip for detecting the reception of a chip within the corresponding groove and transmitting the detection information; and (b) a display associated with each of the at least one groove, the display for displaying, in real-time, the count and the aggregate value of the chips received within the corresponding groove.

18. The tray of claim 17 wherein, the at least one groove comprises a plurality of elongated grooves.

19. The tray of claim 18 wherein, two grooves share a common display panel; the display panel for displaying the count and the aggregated values of the chips within the corresponding grooves.

20. The tray of claim 17 wherein, each of the at least one groove is of uniform substantially semi-circular cross-section.

21. The tray of claim 17 wherein, the chips are received within a groove such that, the chips abut one another about one of the two faces thereof while abutting the groove about the circumferences thereof.

22. The tray of claim 21 wherein, cross-sectionally, the contour of each of the at least one groove matches with the circumference of the chip.

* * * * *